(No Model.)

J. I. CONKLIN.
MECHANICAL MOVEMENT.

No. 412,841. Patented Oct. 15, 1889.

WITNESSES:
Gustave Ditterich
T. F. Bourne

INVENTOR
Joseph I. Conklin
BY Briesen, Steele & Knauth
ATTORNEYS

UNITED STATES PATENT OFFICE.

JOSEPH I. CONKLIN, OF BROOKLYN, NEW YORK, ASSIGNOR OF FIVE-EIGHTHS TO ED. HUERSTEL, OF NEW YORK, N. Y., AND WM. HY. RUSHFORTH, OF RUTHERFORD PARK, NEW JERSEY.

MECHANICAL MOVEMENT.

SPECIFICATION forming part of Letters Patent No. 412,841, dated October 15, 1889.

Application filed July 15, 1889. Serial No. 317,568. (No model.)

*To all whom it may concern:*

Be it known that I, JOSEPH I. CONKLIN, a resident of Brooklyn, Kings county, and State of New York, have invented an Improved Mechanical Movement, of which the following is a specification.

The object of my invention is to convert the rotary motion of a wheel or shaft that is adapted to move in two directions into rotary motion in a single direction.

The invention consists in the novel details of improvement that are more fully hereinafter set forth, and finally pointed out in the claims.

Reference is to be had to the accompanying drawings, forming part of this specification, wherein—

Figure 1:
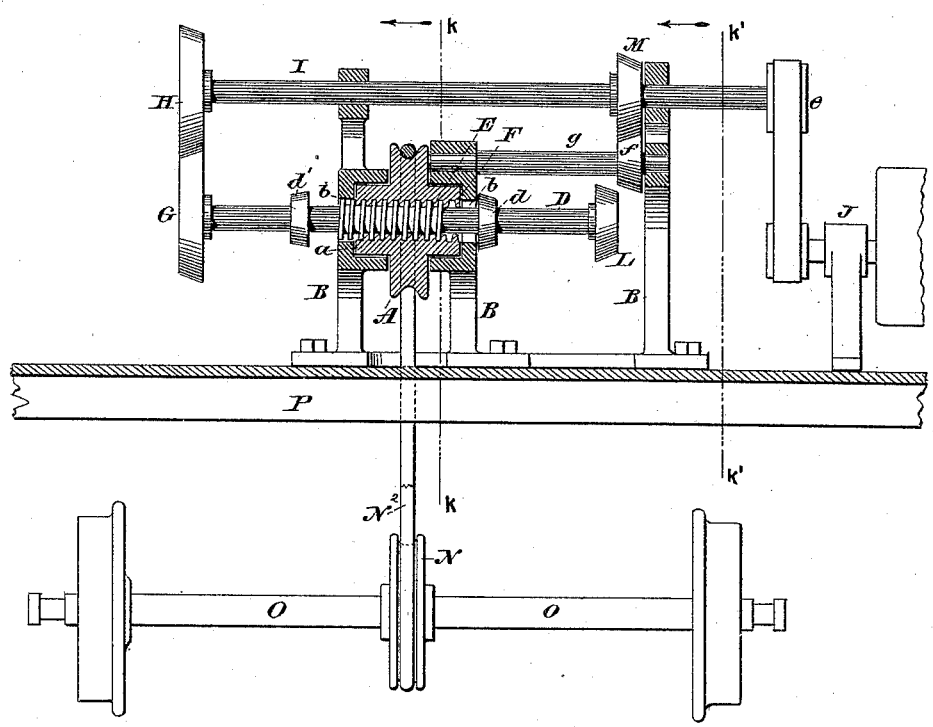
Figure 2:
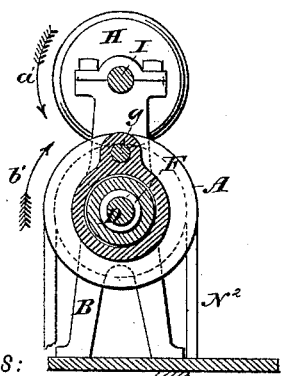
Figure 3:
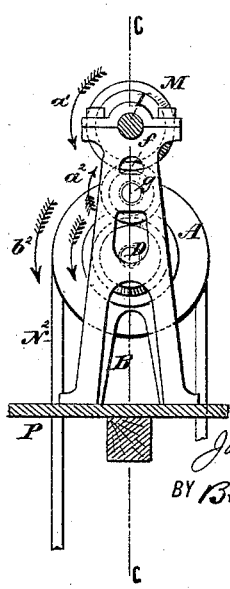

Figure 1 is a vertical longitudinal section, on the plane of the line $c\ c$, Fig. 3, of an apparatus constructed according to my invention. Fig. 2 is a vertical cross-section on the line $k\ k$, Fig. 1; and Fig. 3 is a similar view on the line $k'\ k'$, Fig. 1.

In the accompanying drawings, the letter A indicates a pulley or wheel, which is preferably provided with side trunnions $a$, that are journaled in bearings in a suitable frame or support B. The pulley A supports or is mounted upon a shaft D, that passes freely through openings $b$ in the frame B. The shaft D is provided with external screw-threads E, that work in corresponding threads F in the bore of the pulley A, so that as the pulley rotates the shaft D will receive longitudinal movement.

In order to automatically limit the longitudinal movement of the shaft D and to cause the shaft to rotate with the pulley A in either direction, I place upon the shaft two collars $d$ $d'$, one on either side of the pulley, so that when one collar—say $d$—comes against the side of the frame, pulley, or other abutment (see Fig. 1) the longitudinal movement of the shaft D will be stopped, whereupon the threads of the screws E F will be locked and thus cause the shaft D to rotate with the pulley A. The shaft D carries a friction or gear wheel G, that is adapted to engage a similar wheel H on a shaft I, journaled in suitable bearings in the frame B, which shaft I is to be always rotated in one direction—say in the direction of the arrow $a'$, Figs. 2 and 3. The shaft I is or may be provided with a pulley or the like $e$, by means of which the motion of the shaft I may be communicated to other machinery J—say, for instance, a dynamo—which must always be driven in one direction. When the pulley A is turned in the direction of the arrow $b'$ in Fig. 2, the shaft D will be moved to the left in Fig. 1, so as to bring the wheels G and H in gear, whereupon the shaft I will be turned in the direction of the arrow $a'$. If the pulley A be turned in the reverse direction or in the direction of the arrow $b^2$, Fig. 3, the shaft D will be moved to the right in Fig. 1 by the screws E F, until the collar $d'$ meets its abutment, whereupon the screws E F will be locked and the shaft then turned with the pulley A in the direction $b^2$. The shaft D also carries a friction or gear wheel L similar to G, which is adapted to engage a similar wheel $f$ on a counter-shaft $g$. The wheel $f$ is in gear with a wheel M on the shaft I, so that when the wheel $f$ is turned by the wheel L the wheel M and shaft I will also be turned. The rotation of the pulley A and shaft D in the direction of the arrow $b^2$, as stated, causes the wheel $f$ to turn in the direction of the arrow $a^2$, Fig. 3, whereby the wheel M and shaft I will be turned in the direction of the arrow $a'$, Fig. 3, which is the same direction as the wheels G and H turn the shaft I.

From the foregoing description it will be seen that the rotation of the pulley A in either direction communicates motion to the shaft I in only one direction, whereby rotary motion in either direction is converted into rotary motion in but one direction. The pulley A may be driven by any shaft or wheel whose motion it is desired to retain or convert. In the drawings the pulley A is shown to be driven by a pulley N on the shaft or axle O of a railroad-car, a belt $N^2$ passing from N to A, while the apparatus is mounted upon the floor or platform P of a car. With the above arrangement a dynamo J may be driven by the rotation of the car-axle O, it being immaterial in which direction the car is traveling.

Having now described my invention, what I claim is—

1. In apparatus for converting the rotary motion in two directions of the shaft O into rotary motion in but one direction of the shaft I, the combination of said shafts O I with the threaded longitudinally-movable shaft D and the internally-threaded pulley A, through which the shaft D passes, means, substantially as described, for preventing lateral movement of said pulley, and with two sets of gearing between the shafts D and I, arranged so that when the shaft D is in one position it will actuate one set of gearing and when in another position it will actuate the other set of gearing, as and for the purpose described.

2. In apparatus for converting the rotary motion in two directions of the shaft O into rotary motion in but one direction of the shaft I, the combination of said shafts O I with the threaded longitudinally-movable shaft D, internally-threaded pulley A, through which the shaft D passes, means, substantially as described, for preventing lateral movement of said pulley, and with the intermediate shaft $g$, all arranged for operation substantially as described.

JOSEPH I. CONKLIN.

Witnesses:
FRANK H. EDMUNDS,
JOHN T. SPEER.